Dec. 26, 1961 R. NARMA 3,014,993
PHONOGRAPH PICKUP CARTRIDGE
Filed May 14, 1959 2 Sheets-Sheet 1

INVENTOR.
REIN NARMA
BY
Darby & Darby
ATTORNEYS

Dec. 26, 1961

R. NARMA 3,014,993

PHONOGRAPH PICKUP CARTRIDGE

Filed May 14, 1959

2 Sheets-Sheet 2

INVENTOR.
REIN NARMA
BY Darby & Darby
ATTORNEYS

United States Patent Office 3,014,993

Patented Dec. 26, 1961

3,014,993

PHONOGRAPH PICKUP CARTRIDGE

Rein Narma, Westwood, N.J., assignor to Fairchild Recording Equipment Corporation, Long Island City, N.Y., a corporation of New York Filed May 14, 1959, Ser. No. 813,155
12 Claims. (Cl. 179—100.41)

This invention relates to phonograph pickup cartridges and more particularly to an improved phonograph pickup cartridge of the magneto-dynamic or "moving magnet" type.

Two known types of phonograph pickup cartridges are the electrodynamic or "moving coil" type and the magneto-dynamic or "moving magnet" type. In the electrodynamic type of cartridge, a pickup coil is movably mounted in a constant magnetic field produced by a fixed permanent magnet or the like. The coil is arranged to be moved by the stylus of the cartridge in response to the modulations in the grooves of the record. By this means, a signal voltage corresponding to the record groove modulations is induced in the pickup coil. This type of phonograph pickup cartridge possesses the disadvantage, however, that a relatively large coil and/or magnet must be utilized to produce a sufficiently large output voltage. Since the coil must usually be of light construction to keep the mass of the moving system of the pickup to a minimum, to thereby reduce wearing of the record material, the coil is usually formed by a few turns of small wire. Accordingly, a low signel output is produced with the resulting necessity of employing suitable preamplification means. Furthermore, the large magnet needed may be attracted to any iron present in the turntable equipment, such as in the turntable itself, for example, with the result that a high needle or "tracking" pressure is exerted on the record. Certain of these disadvantages may be avoided by the use of a magnetodynamic or "moving magnet" type of pickup cartridge. In this type, a small magnet, such as a permanent magnet, for example, is moved in response to the modulations in the record grooves and the output signals are induced in one or more fixed pickup coils. Since a relatively small permanent magnet may be employed, the problems associated with the electrodynamic type of pickup cartridge, such as excessive tracking pressure and large effective mass, may be avoided. Furthermore, it is possible to produce a somewhat larger signal voltage by this means, so that the use of preamplification devices may be avoided.

In one known arrangement of a phonograph pickup cartridge of the moving magnet type, the permanent magnet is formed by a rod of magnetic material which has been magnetized in a direction perpendicular to a plane passing through its longitudinal axis. The magnet is mounted for rotation about its longitudinal axis between the sides of an air gap formed in a core of magnetic material. By winding a pair of pickup coils around the core and by suitably affixing a stylus to the magnet, the modulations in a record groove in a laterally recorded record cause the magnet to be rotated, thereby producing a variable flux in the core which induces a signal voltage in the pickup coils. However, it has been found that this arrangement poses certain disadvantages. The first disadvantage is caused by the fact that the air gap in the core renders the cartridge extremely susceptible to "hum" pickup from external magnetic fields, such as produced by the turntable motor and the like. Secondly, when the permanent magnet is in an unbalanced position, that is, when the north-south magnetic axis of the magnet is not parallel to the sides of the air gap, an "unbalance" torque is produced by magnetic attraction which tends to rotate the permanent magnet to a greater extent than that called for by the modulations in the record groove. Since the stylus and the record material have some compliance, and cannot be made absolutely rigid, it is evident that this unbalance torque is difficult to avoid and therefore causes some "odd harmonic" distortion in the output signals. Finally, since the flux from the magnet must pass through the magnetic core to link the pickup coils, the magnetic core must be fabricated of a very high grade of magnetic material to reduce non-linearity and distortion caused by hysteresis, eddy current and Barkhausen effects.

Accordingly, it is an object of this invention to provide a phonograph pickup cartridge of the magnetodynamic type wherein the undesirable effects caused by hum pickup and unbalance torque are substantially eliminated.

It is a further object of this invention to provide a phonograph pickup cartridge of the magnetodynamic type wherein the magnetic core may be fabricated of a low grade, inexpensive, magnetic material without incurring non-linearity and other harmful effects associated with the use of such low grade magnetic material.

It is a still further object of this invention to provide a phonograph pickup cartridge of the magnetodynamic type which is of rugged construction and is relatively simple to manufacture and maintain.

Briefly, the phonograph pickup cartridge of the invention comprises a permanent magnet in the form of a rod which is magnetized in a direction perpendicular to a plane passing through its longitudinal axis. The magnet is mounted for rotation about its longitudinal axis by the stylus and is located in the geometric center of a closed core of magnetic material. Preferably, the core is an annular core, although manufacturing considerations may dictate the use of a rectangular core, as will be explained hereinafter. A pair of pickup coils are wound about the core at opposite points thereon and are electrically connected in series-aiding circuit. When the stylus is moved laterally by the modulations in the record grooves, the magnet is rotated in one direction or the other about its longitudinal axis, so that a voltage is induced in the inner halves of the pickup coils. Since the flux from the magnet links the pickup coils directly and does not first pass through the closed core of magnetic material, the core may be fabricated of a low grade of magnetic material without incurring the distortions caused by the use of such low grade material. Furthermore, it may be noted that the lines of flux cut only the inner halves of each coil, since the closed magnetic core constitutes a magnetic shield which prevents the lines of flux from cutting the outer halves of the coils. Accordingly, any stray flux present will cut both the inner and outer halves of each coil and will thereby effectively cancel out so that spurious output voltages will not be produced in the signal output from the cartridge. Additionally, since the permanent magnet is located at the geometric center of the closed core, the air gap between the magnet and the inner side of the core remains substantially constant for all angular positions of the magnet and thereafter produces no unbalance torques which may lead to the aforementioned odd harmonic distortion. While the closed core and pickup coil arrangement of the pickup cartridge of the invention effectively minimizes the pickup of stray magnetic fields, the invention also provides means for utilizing additional magnetic shielding to eliminate stray flux pickup when the stray magnetic field is not homogeneous.

Figures 1, 2, 3:
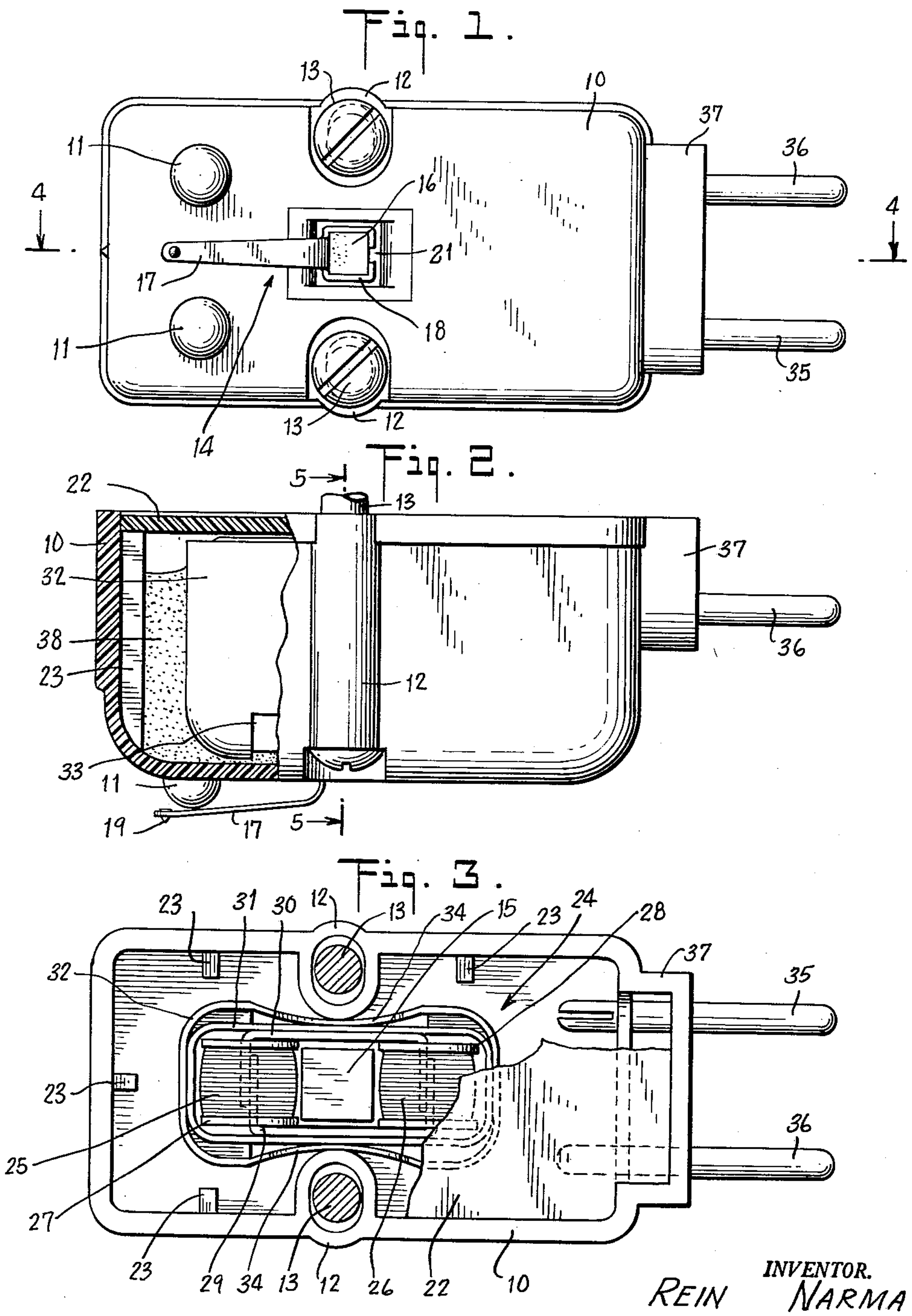
FIG. 1 is a plan view of the bottom of a phonograph pickup cartridge constructed in accordance with the teachings of the invention.
FIG. 2 is a side view of the cartridge of FIG. 1 with the housing partially broken away to reveal certain details of construction.
FIG. 3 is a plan view of the top of the cartridge with the cover partially broken away to reveal details of construction.
Figure 4:
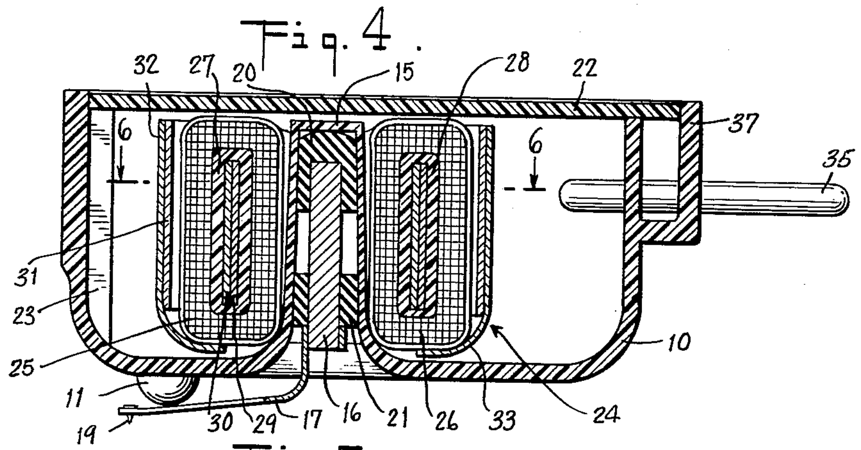
FIG. 4 is a sectional view taken along the line 4—4 of FIG. 1.
Figure 5:
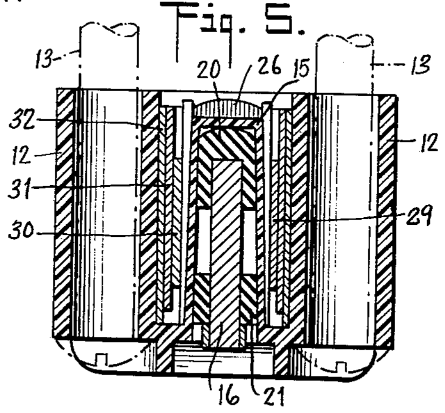
FIG. 5 is a sectional view taken along the line 5—5 of FIG. 2.
Figure 7:
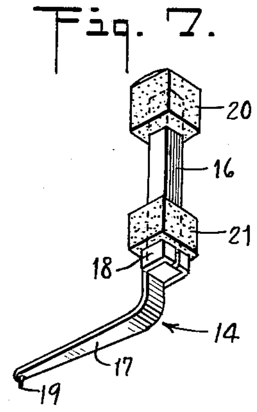
FIG. 7 is a perspective view of the stylus assembly of the cartridge.

Referring now to FIG. 1 of the drawing, there is shown a phonograph pickup cartridge of the magneto dynamic type constructed in accordance with the teachings of the invention. As seen in FIG. 1, the cartridge comprises a housing 10 which may be conveniently formed of a plastic material or the like. A pair of spherical bosses 11 are formed on the bottom of the housing to prevent damage to the stylus assembly should the cartridge be accidently dropped on the turntable. The housing has a pair of internally apertured flanges 12 formed thereon to accommodate a pair of mounting screws 13 which may be employed to secure the cartridge to the assembly of the turntable equipment. A stylus assembly, indicated generally as 14, is mounted within a centrally located, vertically extending, hollow boss 15 which is formed by the housing 10, as seen in FIGS. 4 and 5 of the drawings. The stylus assembly is illustrated in FIG. 7 of the drawings and is seen to comprise a permanent rod magnet 16, which may be formed of a magnetic material such as Alnico, for example. The rod magnet 16 is magnetized in a direction perpendicular to a plane passing through its longitudinal axis and is adapted to be rotated about its longitudinal axis. By utilizing a movable magnet of this shape, the magnet is given a small moment of inertia. A stylus arm 17, which may be fabricated of sheet aluminum, for example, is secured to the lower end of magnet 16 by a split collar 18 which is formed by one end of the stylus arm. A diamond stylus 19 is secured to the other end of the stylus arm 17 by suitable means, such as riveting and cementing, for example. The magnet 16 is held in place within the hollow boss 15 by support blocks 20 and 21 which are formed of a material having high compliance and mechanical damping characteristics, such as butyl rubber, for example. The support blocks are fixedly mounted by cementing them to the inner surfaces of the hollow boss 15. Since the blocks 20 and 21 are formed of a material having a high compliance, the magnet 16 may be rotated about its longitudinal axis within the boss 15 by the lateral movements of the stylus 19 caused by the modulations in the record grooves. The resiliency of blocks 20 and 21 also serves to provide a restoring couple for the stylus to return it to its normal or balanced position in the absence of modulations in the record grooves. Furthermore, the mechanical damping properties of the blocks 20 and 21 have the effect of substantially reducing the effective mass and record material compliance resonance in the audio frequency range.

Figure 6:
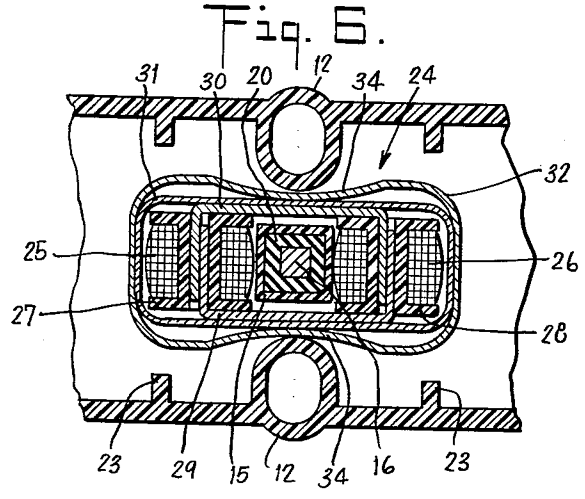
FIG. 6 is a sectional view taken along the line 6—6 of FIG. 4.

The housing 10 is provided with a cover 22 which may be formed of a magnetic shielding material, such as Mu-Metal, for example. The cover is seated on a plurality of lands formed by ribs 23 which are molded on the inside of the housing 10. A pickup coil assembly, indicated generally as 24, is located around the hollow boss 15 on the inside of housing 10. The coil assembly includes a pickup coil 25 and a pickup coil 26 which are respectively wound upon coil forms 27 and 28, as seen in FIGS. 3 and 6 of the drawings. The coils 25 and 26 are connected in series-aiding circuit by thin wires (not shown). A closed rectangular core is provided for the pickup coils by U-shaped members 29 and 30 which extend within each of the coil forms 27 and 28. It will be understood that the closed core could be integrally formed by a single member, if desired, instead of the two separate members 29 and 30. However, for ease of manufacture, the two separate members are utilized, since they form for all practical purposes a closed magnetic core. The members 29 and 30 may be fabricated of a low grade of magnetic material, such as silicon steel, for example. It may be noted that the hollow boss 15 is located at the geometric center of the closed rectangular core formed by core members 29 and 30, so that the axis of rotation of magnet 16 is perpendicular to the plane of the core and passes through the geometric center of the closed core. A rectangular envelope 31 of non-magnetic material, such as copper, for example, is placed around the assembled coils and core members to isolate the pickup coils from a magnetic shielding can 32, which is placed around the assembled coils, core and envelope. The shielding can 32 is formed of a magnetic material, such as Mu-Metal, for example, and serves to shield the pickup coils from non-homogeneous, stray magnetic fields. As seen in FIGS. 2 and 4 of the drawings, the can 32 is cut away at 33 to accommodate the boss 15. The sides of the can are curved inwardly at 34, as seen in FIGS. 3 and 6 of the drawings, to engage the envelope 31 and firmly seat the assembly within the housing 10. The housing 10 is also provided with a rectangular extension 37 in which are mounted terminal pins 35 and 36 which are connected by wires (not shown) to the ends of the series-connected pickup coils 25 and 26. Finally, the interior of the housing 10 is filled with a protective potting compound 38, which may be a low melting point polyethylene compound, for example.

During operation of the above-described pickup cartridge, the stylus 19 is laterally moved by the modulations in the record grooves so that the rod magnet 16 is rotated about its longitudinal axis. Since the magnet 16 is magnetized in a direction perpendicular to a plane passing through its longitudinal axis and the magnet is mounted with its axis of rotation passing through the geometric center of the closed core formed by members 29 and 30, the flux from the magnet directly links only the inner halves of the coils 25 and 26. The flux from the magnet does not link the outer halves of the pickup coils because of the closed magnetic core passing through the center of the coils which acts as a magnetic shield. This means that only the inner halves of the coils are effective to produce the signal voltage in response to the movements of magnet 16. Since the voltages induced in the inner halves of the pickup coils are in phase and the coils are serially connected, they combine to produce the final output voltage from the cartridge appearing at pins 35 and 36. It may be noted that, unlike the prior art magnetodynamic pickup cartridges, the cartridge of the invention does not depend upon the magnetic flux in the closed core to link the pickup coils, since the inner halves of the coils are directly linked by the flux from the magnet. This means that a low grade of magnetic material, such as the aforementioned silicon steel, for example, may be utilized for the core without incurring nonlinearity of distortion caused by hysteresis, eddy current or Barkhausen effects. Furthermore, since there is no air gap in the magnetic core of the cartridge of the invention, hum pickup from stray fields is minimized. The closed core formed by members 29 and 30 serves merely as a magnetic shield, so that the flux in the core is substantially constant at all times unlike the prior art arrangements. Indeed, if the closed magnetic core were to be removed, there would be no output voltage produced by the coils 25 and 26, since substantially equal and opposite voltages would be produced in each coil and would effectively cancel each other out. Due to the fact that the movable magnet 16 is mounted at the geometric center of the closed core, the air gap between the magnet and the inner sides of the core is substantially constant for all angular positions of the magnet, so that little, if any, unbalance torque is produced and odd harmonic distortion is minimized. Finally, the arrangement is relatively unaffected by homogeneous stray magnetic fields since such fields link both the inner and outer half of each of the pickup coils 25 and 26, with the result that the resulting voltages effectively cancel out. However, since stray magnetic fields may be encountered which are not homogeneous, the shielding can 32 is provided to protect the pickup coils.

Figure 8:
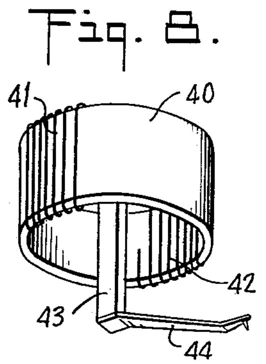
FIG. 8 is a perspective view of a closed core arrangement constituting an alternative embodiment of the invention.

While the above-described embodiment of the invention employs a closed rectangular core, it will be understood that an annular core may be utilized with equal, if not greater, effectiveness. The annular core configuration is preferable in that the air gap between the moving magnet and the inner sides of the core is more nearly constant than for a rectangular core, with the result that unbalance torque may be almost completely eliminated. An example of an annular core construction is schematically illustrated in FIG. 8 of the drawings, wherein the closed annular core 40 is shown with a pair of pickup coils 41 and 42 mounted at opposite points thereon. A rod magnet 43 and stylus arm 44 are shown as being positioned at the geometric center of the core 40, so that lateral movements of the stylus arm 44 causes the magnet 43 to be rotated about it longitudinal axis. The operation of this embodiment of the invention is identical with the embodiment shown in FIGS. 1–7 of the drawings and will not be described further. While the closed annular core may be preferred for the complete uniformity of the air gap and the resulting substantially complete elimination of unbalance torque, the rectangular core of the embodiment of FIGS. 1–7 offers the advantage of simplicity of manufacture.

It is believed apparent that many changes could be made in the above construction and many apparently widely different embodiments of the invention made without departing from the scope thereof. For example, closed core configurations other than the annular and rectangular cores disclosed could be utilized. Similarly, the rotatable permanent magnet disclosed could be replaced by any convenient means for producing a constant magnetic field. Accordingly, it is intended that all matter contained in the above description or shown in the accompanying drawings shall be interpreted as illustrative and not in a limiting sense.

What is claimed is:

1. A phonograph pickup cartridge of the magnetodynamic type comprising a closed core of magnetic material; pickup coil means wound about said core; rotatable magnet means for producing a constant magnetic field in a direction perpendicular to a plane passing through the axis of rotation of the magnet means; means for mounting said magnet means within said core with said axis of rotation perpendicular to the plane of the core and passing through the geometric center of the core, so that the inner half of said pickup coil means is adapted to be linked by the magnetic field produced by said magnet means and the outer half of said coil means is magnetically shielded from said magnetic field by said core; and stylus means connected to said magnetic means for rotating said magnet means.

2. A phonograph pickup cartridge as claimed in claim 1, wherein said magnet means comprises a permanent magnet.

3. A phonograph pickup cartridge as claimed in claim 1, wherein said closed core is a rectangular core.

4. A phonograph pickup cartridge as claimed in claim 1, wherein said closed core is an annular core.

5. A phonograph pickup cartridge of the magnetodynamic type comprising a closed core of magnetic material; a pair of pickup coils connected in series-aiding circuit and wound about said core at opposite points thereon; a rotatable permanent magnet magnetized in a direction perpendicular to a plane passing through the axis of rotation of the magnet; means for mounting said magnet within said core with said axis of rotation perpendicular to the plane of the core and passing through the geometric center of the core, so that the inner half of each of said pickup coils is adapted to be linked by the magnetic field produced by said magnet and the outer half of each coil is magnetically shielded from said magnetic field by said core; and a stylus connected to said magnet for rotating said magnet in response to the modulations in a record groove, to thereby induce electric signals corresponding to said groove modulations in the inner halves of said pickup coils.

6. A phonograph pickup cartridge as claimed in claim 5, which further comprises magnetic shielding means positioned around said pickup coils for shielding said coils from non-homogeneous stray magnetic fields.

7. A phonograph pickup cartridge as claimed in claim 5, wherein said permanent magnet is a rod rotatable about the longitudinal axis thereof.

8. A phonograph pickup cartridge as claimed in claim 7, wherein said means for mounting said permanent rod magnet comprises a pair of support blocks surrounding said rod magnet at spaced points along the length thereof, said support blocks being formed of a material having high compliance and mechanical damping characteristics, and means for fixedly mounting said support blocks.

9. A phonograph pickup cartridge as claimed in claim 8, wherein said closed core is a rectangular core.

10. A phonograph pickup cartridge as claimed in claim 8, wherein said closed core is an annular core.

11. A phonograph pickup cartridge of the magnetodynamic type comprising a housing having a centrally located, vertically extending, hollow boss formed therein; a pair of U-shaped magnetic core members positioned around said boss within said housing to form a closed rectangular core with the boss located at the geometric center of said core; a pair of pickup coils electrically connected in series-aiding circuit and wound about said core at opposite points thereon; a shielding can formed of magnetic material located around said closed core and said pickup coils for magnetically shielding said coils from stray magnetic fields; a permanent rod magnet magnetized in a direction perpendicular to a plane passing through the longitudinal axis thereof; a pair of support blocks formed of a material having high compliance and mechanical damping characteristics surrounding said rod magnet at spaced points along the length thereof and mounted within said hollow boss, so that said magnet is vertically positioned within said boss and is rotatable about the longitudinal axis of the magnet; and a stylus connected to the lower end of said rod magnet for rotating said magnet in response to the modulations in a record groove, whereby the magnetic field produced by said magnet links the inner halves of said pickup coils to induce a signal therein corresponding to said groove modulations.

12. A phonograph pickup cartridge as claimed in claim 11, which further comprises an envelope of non-magnetic material positioned between said shielding can and said pickup coils for isolating said coils from said can.

References Cited in the file of this patent

UNITED STATES PATENTS

| | | |
|---|---|---|
| 2,101,665 | Arey et al. | Dec. 7, 1937 |
| 2,501,233 | O'Brien | Mar. 21, 1950 |
| 2,897,443 | Mendelsohn | July 28, 1959 |

FOREIGN PATENTS

| | | |
|---|---|---|
| 896,121 | Germany | Nov. 9, 1953 |

UNITED STATES PATENT OFFICE

CERTIFICATE OF CORRECTION

Patent No. 3,014,993 December 26, 1961

Rein Narma

It is hereby certified that error appears in the above numbered patent requiring correction and that the said Letters Patent should read as corrected below.

Column 1, line 30, for "signel" read -- signal --; column 2, line 57, for "thereafter" read -- therefore --; column 5, line 60, for "magnetic" read -- magnet --.

Signed and sealed this 24th day of April 1962.

(SEAL)
Attest:

ESTON G. JOHNSON
Attesting Officer

DAVID L. LADD
Commissioner of Patents